United States Patent
Fang et al.

(10) Patent No.: US 9,094,070 B2
(45) Date of Patent: Jul. 28, 2015

(54) METHOD AND APPARATUS FOR TRANSMITTING DATA

(71) Applicant: Huawei Technologies Co., Ltd., Shenzhen, Guangdong (CN)

(72) Inventors: Dongmei Fang, Shenzhen (CN); Wei Ruan, Shenzhen (CN); Heng Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 44 days.

(21) Appl. No.: 14/053,238

(22) Filed: Oct. 14, 2013

(65) Prior Publication Data

US 2014/0044213 A1 Feb. 13, 2014

Related U.S. Application Data

(63) Continuation of application No. PCT/CN2011/073178, filed on Apr. 22, 2011.

(51) Int. Cl.
| | |
|---|---|
| *H04B 7/06* | (2006.01) |
| *H04B 7/04* | (2006.01) |
| *H01Q 1/24* | (2006.01) |
| *H01Q 3/26* | (2006.01) |
| *H01Q 21/24* | (2006.01) |
| *H04B 7/10* | (2006.01) |

(52) U.S. Cl.
CPC ............ *H04B 7/0615* (2013.01); *H01Q 1/246* (2013.01); *H01Q 3/26* (2013.01); *H01Q 21/24* (2013.01); *H04B 7/0469* (2013.01); *H04B 7/0691* (2013.01); *H04B 7/10* (2013.01)

(58) Field of Classification Search
CPC ..................... H04B 7/0615; H04B 7/0617
USPC .......................................... 375/267, 260, 259
See application file for complete search history.

(56) References Cited

U.S. PATENT DOCUMENTS 8,885,754 B2 * 11/2014 Kim et al. ................. 375/267
2007/0060052 A1 3/2007 Hara

FOREIGN PATENT DOCUMENTS

| CN | 1997183 A | 7/2007 |
|---|---|---|
| CN | 101562504 A | 10/2009 |
| CN | 101969352 A | 2/2011 |
| JP | 2003298546 A | 10/2003 |

OTHER PUBLICATIONS

International Search Report in corresponding PCT Patent Application No. PCT/CN2011/073178 (Nov. 3, 2011).

* cited by examiner

*Primary Examiner* — Michael Neff
(74) *Attorney, Agent, or Firm* — Leydig, Voit & Mayer, Ltd.

(57) ABSTRACT

Embodiments of the present disclosure provide a data transmission method and an apparatus. The method mainly includes: forming multiple antennas of a BS (base station) into a cross polarization antenna array, and calculating a weighted matrix of a to-be-transmitted data stream of the BS according to channel information between the BS and an MS (mobile station); performing weighted processing on the to-be-transmitted data stream of the BS according to the weighted matrix, and sending a data stream that has undergone the weighted processing from the BS to the MS. The embodiments of the present disclosure may enhance the demodulation performance because the cross polarization antenna array is adopted at the BS, and certain irrelevancy exists between cross antennas; therefore, the embodiments of the present disclosure may significantly enhance the overall performance of sending the data stream from a BS side to an MS side.

8 Claims, 2 Drawing Sheets

METHOD AND APPARATUS FOR TRANSMITTING DATA

CROSS-REFERENCE TO RELATED APPLICATIONS

This application is a continuation of International Patent Application No. PCT/CN2011/073178, filed on Apr. 22, 2011, which is hereby incorporated by reference in its entirety.

TECHNICAL FIELD

The present disclosure relates to the field of communications technologies, and in particular, to a method and apparatus for transmitting data.

BACKGROUND

A BF (Beamforming, beamforming) weighting method adopts a multi-antenna array, generates a corresponding weighted value by using channel information and weights transmit signals of multiple antennas, so as to enable the transmit signals of the multiple antennas to implement in-phase superposition and enhancement among one another when reaching the receive end, just like that they are converged to the same beam. Therefore, a signal to noise ratio is increased and a multi-antenna array gain and a certain diversity gain are obtained. The BF weighting method includes an EGT (Equal Gain Transmit, equal gain transmit) weighting method and an MRT (Maximum Ratio Transmit, maximum ratio transmit) weighting method.

In a multi-antenna MIMO (Multi Input Multi Output, multi input multi output) system, an MIMO A or MIMO B transmission format is separately adopted on two antennas to send a data stream at the same time.

In an actual application, an MIMO+BF technology is generally adopted to enhance the performance of dual stream transmission. At the transmit end, channel information is used to generate a corresponding weighted value, and the signal to noise ratio of the receive end is increased by using weighting, so as to enhance the performance of MIMO.

A solution of transmitting a data stream by adopting the MIMO+BF technology in the prior art mainly includes that: a multi-antenna array of the transmit end adopts a vertical polarization antenna array. A characteristic of this antenna array is that channel relevancy between the antennas is strong.

At least the following problems exist in the prior art:

When a data stream is transmitted by adopting the MIMO+ BF technology, in order to obtain the good diversity gain and demodulation performance in the two transmission formats MIMO A and MIMO B, irrelevancy between the antennas needs to be used. However, in this method, because the channel relevancy between the antennas is strong, the overall performance of the MIMO+BF technology is affected.

SUMMARY

Embodiments of the present disclosure provide a method and an apparatus for transmitting data, to increase the overall performance for a BS (base station, base station) adopting a multi-antenna array to send a data stream to an MS (mobile station, mobile station).

A data transmission method, forming multiple antennas of a BS into a cross polarization antenna array, specifically includes:

calculating a weighted matrix of a to-be-transmitted data stream of the BS according to channel information between the BS and an MS; and performing weighted processing on the to-be-transmitted data stream of the BS according to the weighted matrix, and sending a data stream that has undergone the weighted processing from the BS to the MS.

A data transmission apparatus includes:

a weighted matrix calculating module, configured to calculate a weighted matrix of a to-be-transmitted data stream of a BS according to channel information between the BS and an MS, where multiple antennas of the BS form a cross polarization antenna array; and a weighted sending processing module, configured to perform weighted processing on the to-be-transmitted data stream of the BS according to the weighted matrix, and send a data stream that has undergone the weighted processing from the BS to the MS.

It may be seen from the foregoing technical solutions provided by the embodiments of the present disclosure that, the embodiments of the present disclosure may enhance the demodulation performance because the cross polarization antenna array is adopted at the BS, and certain irrelevancy exists between cross antennas; therefore, the embodiments of the present disclosure may significantly enhance the overall performance of sending the data stream from a BS side to an MS side.

DESCRIPTION OF EMBODIMENTS

The following describes embodiments of the present disclosure with reference to accompanying drawings.

In the embodiments of the present disclosure, multiple antennas of a base station BS form a cross polarization antenna array, and a weighted matrix of a to-be-transmitted data stream of the BS is calculated according to channel information between the BS and an MS. Then, weighted processing is performed on the to-be-transmitted data stream of the BS according to the weighted matrix, and a data stream that has undergone the weighted processing is sent from the BS to the MS.

Figure 1:
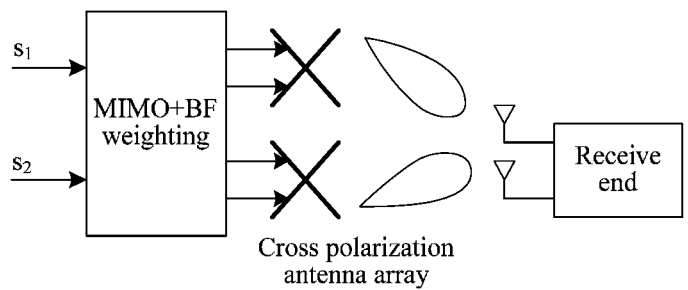
FIG. 1 is a schematic principle diagram of a data transmission method, which is based on an MIMO+BF technology using a cross polarization antenna array and put forward by embodiment of the present disclosure.
Figure 2:
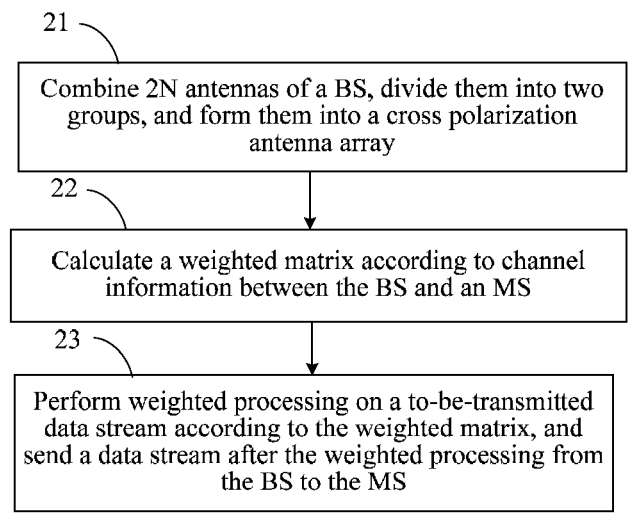
FIG. 2 is a specific processing flowchart of a data transmission method, which is based on an MIMO+BF technology using a cross polarization antenna array and put forward by embodiment of the present disclosure.

A schematic principle diagram of a data transmission method, which is based on an MIMO+BF technology using a cross polarization antenna array and put forward by the embodiment, is shown in FIG. 1. A specific processing process includes the following processing steps, as shown in FIG. 2:

Step 21: Divide 2N antennas of a BS (base station, base station) into two groups, and form them into a cross polarization antenna array.

The multiple (2N) antennas of the BS are divided, and form the cross polarization antenna array. A specific operation is that: the multiple antennas of the BS are divided into two groups according to a polarization direction, the polarization directions of the antennas in each group are the same (i.e., polarization directions are parallel to each other), and the polarization directions of the antennas between the two groups are perpendicular or orthogonal to each other, thereby forming the cross polarization antenna array.

In an actual application, the N may be any integer. For example, when N=2, the BS has 4 transmit antennas, and an MS (mobile station, mobile station) has 2 receive antennas, a channel response between a first antenna of the BS and a first antenna of the MS is $h_{11}$, a channel response between a second antenna of the BS and the first antenna of the MS is $h_{12}$, a channel response between a third antenna of the BS and the first antenna of the MS is $h_{13}$, and a channel response between a fourth antenna of the BS and the first antenna of the MS is $h_{14}$;

a channel response between the first antenna of the BS and a second antenna of the MS is $h_{21}$, a channel response between the second antenna of the BS and the second antenna of the MS is $h_{22}$, a channel response between the third antenna of the BS and the second antenna of the MS is $h_{23}$, and a channel response between the fourth antenna of the BS and the second antenna of the MS is $h_{24}$.

The first antenna and the third antenna of the BS are a first group, and the second antenna and the fourth antenna of the BS are a second group. The polarization directions of the two antennas in the first group are the same, and the polarization directions of the two antennas in the second group are the same. The polarization directions of the antennas between the first group and the second group are perpendicular or orthogonal to each other, that is, the polarization direction of the two antennas in the first group and the polarization direction of the two antennas in the second group are perpendicular or orthogonal to each other.

The 8 channel responses may form a downlink channel response matrix:

$$h = \begin{bmatrix} h_{11} & h_{21} \\ h_{12} & h_{22} \\ h_{13} & h_{23} \\ h_{14} & h_{24} \end{bmatrix} = [h_1 \ h_2]$$

Step 22: Calculate a weighted matrix according to channel information between the BS and the MS.

MIMO encoding is performed on to-be-transmitted data of the BS to obtain a data stream $$s = \begin{bmatrix} s_1 \\ s_2 \end{bmatrix},$$

where the $S_1$ and the $S_2$ are two data streams.

The weighted matrix of the data stream s is calculated based on the channel information, such as the channel responses between the antennas of the BS and the antennas of the MS.

$$w = \begin{bmatrix} w_{11} & w_{12} \\ w_{21} & w_{22} \\ w_{31} & w_{32} \\ w_{41} & w_{42} \end{bmatrix}.$$

The $w_{11}$ is a weighted value corresponding to the $S_1$ data stream on the first antenna, the $w_{12}$ is a weighted value corresponding to the $S_2$ data stream on the first antenna, the $w_{21}$ is a weighted value corresponding to the $S_1$ data stream on the second antenna, the $w_{22}$ is a weighted value corresponding to the $S_2$ data stream on the second antenna, the $w_{31}$ is a weighted value corresponding to the $S_1$ data stream on the third antenna, the $w_{32}$ is a weighted value corresponding to the $S_2$ data stream on the third antenna, the $w_{41}$ is a weighted value corresponding to the $S_1$ data stream on the fourth antenna, and the $w_{42}$ is a weighted value corresponding to the $S_2$ data stream on the fourth antenna.

When only one data stream of the two data streams is sent on each antenna, for example, when only the $S_1$ data stream is sent on the first antenna, the weighted value $w_{12}$ corresponding to the $S_2$ data stream on the first antenna is 0; when only the $S_2$ data stream is sent on the second antenna, the weighted value $w_{21}$ corresponding to the $S_1$ data stream on the first antenna is 0; when only the $S_1$ data stream is sent on the third antenna, the weighted value $w_{32}$ corresponding to the $S_2$ data stream on the third antenna is 0; when only the $S_2$ data stream is sent on the fourth antenna, the weighted value $w_{41}$ corresponding to the $S_1$ data stream on the fourth antenna is 0.

The weighted matrix may be written as:

$$w = \begin{bmatrix} w_{11} & 0 \\ 0 & w_{22} \\ w_{31} & 0 \\ 0 & w_{42} \end{bmatrix}$$

Step 23: Perform weighted processing on the data stream according to the weighted matrix, and send a data stream that has undergone the weighted processing from the BS to the MS.

The weighted processing may be performed in a set weighting mode on the data stream s according to the weighted matrix w to obtain a to-be-transmitted data stream w·s that has undergone the weighted processing. The adopted weighting mode may be an EGT (Equal Gain Transmit, equal gain transmit) mode, or may be an MRT (Maximum Ration Transmit, maximum ration transmit) mode.

The data stream w·s that has undergone the weighted processing is transmitted to the MS through each antenna of the BS corresponding to the MS. On each antenna of the BS, the data stream w·s may be sent to the MS.

The data stream received by the MS is Y=hws+N, where the N is a channel noise.

The following embodiment provides multiple methods for calculating the weighted matrix w:

Method 1: A column vector of a channel response between each antenna of the BS and a certain antenna of the MS is $h_1$, then a first column vector of the weighted matrix w is $$w_1 = \frac{h_1^*}{\|h_1\|},$$

where the vector $h_1^*$ indicates a conjugate of $h_1$, and the $\|h_1\|$ indicates a modulus value of the vector $h_1$;

the second column vector $W_2$ of the weighted matrix w is an orthogonal vector of the first column vector $W_1$;

the weighted matrix w=[$w_1$, $w_2$].

For example, when the BS has 4 transmit antennas, the MS has 2 receive antennas, and the column vector of the corresponding channel response between each antenna of the BS and the certain antenna of the MS is $$h_1 = \begin{bmatrix} h_{11} \\ h_{12} \\ h_{13} \\ h_{14} \end{bmatrix},$$

the first column vector of the weighted matrix w is $$w_1 = \frac{h_1^*}{\|h_1\|},$$

where the $h_1^*$ indicates the conjugate of the vector $h_1$, and the $\|h_1\|$ indicates the modulus value of the vector $h_1$.

The second column vector $w_2$ of the weighted matrix w is an orthogonal vector of the first column vector. The $$w_1 = \begin{bmatrix} w_{11} \\ w_{21} \\ w_{31} \\ w_{41} \end{bmatrix},$$

the $$w_2 = \begin{bmatrix} w_{12} \\ w_{22} \\ w_{32} \\ w_{42} \end{bmatrix},$$

and the weighted matrix $w=[w_1, w_2]$.

This method may also be applicable to a case where the BS has 2N (N is an integer, and N is greater than 2) transmit antennas, and the number of receive antennas of the MS is greater than 2. In addition, this method is also applicable when the number of receive antennas of the MS is 1.

Method 2: When the BS has 4 transmit antennas, the channel response between the first antenna of the BS and the first antenna of the MS is $h_{11}$, the channel response between the second antenna of the BS and the first antenna of the MS is $h_{12}$, the channel response between the third antenna of the BS and the first antenna of the MS is $h_{13}$, the channel response between the fourth antenna of the BS and the first antenna of the MS is $h_{14}$, where the first antenna and the third antenna are the first group, the second antenna and the fourth antenna are the second group, the polarization directions of two antennas in each group are the same, and the polarization directions of the antennas between the first group and the second group are orthogonal to each other.

Then, $$r = \sum_{k=1}^{N} (h_{11}(k) \cdot h_{13}^*(k) + h_{12}(k) \cdot h_{14}^*(k)),$$

where k is an index of the channel responses, and N is a statistic sum of the channel responses;

the weighted matrix is $$w = \begin{bmatrix} \frac{r^*}{|r|} & 0 \\ 0 & \frac{r^*}{|r|} \\ 1 & 0 \\ 0 & 1 \end{bmatrix};$$

where r* indicates a conjugate of r.

Method 3: Similar to the case in the method 2, when the BS has 4 transmit antennas, $$r_1 = \sum_{k=1}^{N} (h_{11}(k) \cdot h_{13}^*(k))$$

$$r_2 = \sum_{k=1}^{N} (h_{12}(k) \cdot h_{14}^*(k))$$

Where k is an index of the channel responses, N is a statistic sum of the channel responses, $h_{13}^*$ indicates a conjugate of $h_{13}$, and $h_{14}^*$ indicates a conjugate of $h_{14}$;

the weighted matrix is $$w = \begin{bmatrix} \frac{r_1^*}{|r_1|} & 0 \\ 0 & \frac{r_2^*}{|r_2|} \\ 1 & 0 \\ 0 & 1 \end{bmatrix};$$

where $r_1^*$ indicates a conjugate of $r_1$, and $r_2^*$ indicates a conjugate of $r_2$.

In the methods 2 and 3, the number of receive antennas of the MS is generally at least 2, but the methods are also applicable when the number of receive antennas of the MS is 1.

When a communications system learns a channel response matrix h(k) between each antenna of the BS and each antenna of the MS, the method for calculating the weighted matrix w(k) is as follows:

Method 1: SVD (Singular value decomposition, singular value decomposition) is performed on h(k) to obtain two singular vectors of the matrix h(k), and conjugates of the two singular vectors are used as two column vectors of the weighted matrix w(k).

Method 2: The weighted matrix w(k)=h*(k), where h*(k) indicates a conjugate of h(k).

Method 3: A channel covariance matrix $$R = \sum_{k=1}^{N} (h(k) \cdot h^H(k))$$

is calculated, where k is an index of the channel responses, N is a statistic sum of the channel responses, and $h^H(k)$ indicates a conjugate transpose of h(k). Eigenvalue decomposition is performed on R to obtain two character vectors corresponding to a greatest eigenvalue and a second greatest eigenvalue of R. Conjugates of the two character vectors are used as two column vectors of the weighted matrix w.

For example, in a specific embodiment, when the BS has 4 transmit antennas, and the MS has 2 receive antennas, the channel response between the first antenna of the BS and the first antenna of the MS is $h_{11}$, the channel response between the second antenna of the BS and the first antenna of the MS is $h_{12}$, the channel response between the third antenna of the BS and the first antenna of the MS is $h_{13}$, the channel response between the fourth antenna of the BS and the first antenna of the MS is $h_{14}$, where the first antenna and the third antenna of the BS are the first group, the second antenna and the fourth antenna of the BS are the second group, the polarization directions of two antennas in each group are the same, and the polarization directions of the antennas between the first group and the second group are orthogonal to each other;

the channel response between the first antenna of the BS and the second antenna of the MS is $h_{21}$, the channel response between the second antenna of the BS and the second antenna of the MS is $h_{22}$, the channel response between the third antenna of the BS and the second antenna of the MS is $h_{23}$, and the channel response between the fourth antenna of the BS and the second antenna of the MS is $h_{24}$;

when the communications system learns that the channel response matrix between each antenna of the BS and each antenna of the MS is $$h(k) = \begin{bmatrix} h_{11}(k) & h_{21}(k) \\ h_{12}(k) & h_{22}(k) \\ h_{13}(k) & h_{23}(k) \\ h_{14}(k) & h_{24}(k) \end{bmatrix} = [h_1(k) \ h_2(k)],$$

the methods for calculating the weighted matrix w include the following:

Method 1:

$$r = \sum_{k=1}^{N} (h_{11}(k) \cdot h_{13}^*(k) + h_{12}(k) \cdot h_{14}^*(k) + h_{21}(k) \cdot h_{23}^*(k) + h_{22}(k) \cdot h_{24}^*(k))$$

where k is an index of the channel responses, N is a statistic sum of the channel responses, $h_{13}^*$ indicates a conjugate of $h_{13}$, $h_{14}^*$ indicates a conjugate of $h_{14}$, $h_{23}^*$ indicates a conjugate of $h_{23}$, and $h_{24}^*$ indicates a conjugate of $h_{24}$.

The weighted matrix $$w = \begin{bmatrix} \frac{r^*}{|r|} & 0 \\ 0 & \frac{r^*}{|r|} \\ 1 & 0 \\ 0 & 1 \end{bmatrix}$$

where $r^*$ indicates a conjugate of r.

Method 2:

$$r_1 = \sum_{k=1}^{N} (h_{11}(k) \cdot h_{13}^*(k) + h_{21}(k) \cdot h_{23}^*(k))$$

$$r_2 = \sum_{k=1}^{N} (h_{12}(k) \cdot h_{14}^*(k) + h_{22}(k) \cdot h_{24}^*(k))$$

where k is an index of the channel responses, N is a statistic sum of the channel responses, $h_{13}^*$ indicates a conjugate of $h_{13}$, $h_{14}^*$ indicates a conjugate of $h_{14}$, $h_{23}^*$ indicates a conjugate of $h_{23}$, and $h_{24}^*$ indicates a conjugate of $h_{24}$.

The weighted matrix $$w = \begin{bmatrix} \frac{r_1^*}{|r_1|} & 0 \\ 0 & \frac{r_2^*}{|r_2|} \\ 1 & 0 \\ 0 & 1 \end{bmatrix}$$

where $r_1^*$ indicates a conjugate of $r_1$, and $r_2^*$ indicates a conjugate of $r_2$.

In a Wimax TDD system, as a data transmission method based on an MIMO+BF technology using a cross polarization antenna array in embodiments of the present disclosure is adopted, MIMO transmission performance has about 15 dB gain compared with a case where a multi-antenna array is a vertical polarization antenna array.

Figure 3:
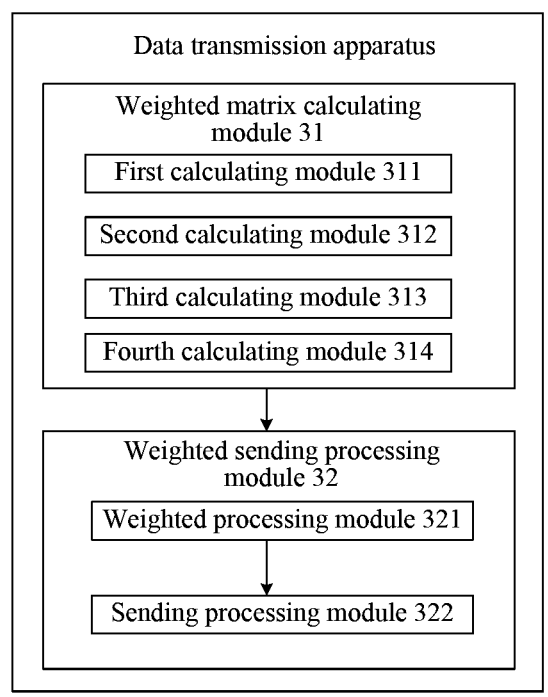
FIG. 3 is a specific structural diagram of a data transmission apparatus according to an embodiment of the present disclosure.

Based on the data transmission method, an embodiment of the present disclosure further provides a data transmission apparatus, and a specific structure includes the following processing modules, as shown in FIG. 3:

a weighted matrix calculating module 31, configured to calculate a weighted matrix of a to-be-transmitted data stream of a BS according to channel information between the BS and an MS, where multiple antennas of the BS form a cross polarization antenna array;

where the multiple (2N) antennas of the BS are divided, and form the cross polarization antenna array; a specific operation is that: the multiple antennas of the BS are divided into two groups according to a polarization direction, the polarization directions of the antennas in each group are the same, and the polarization directions of the antennas between the two groups are orthogonal to each other, thereby forming the cross polarization antenna array; and a weighted sending processing module 32, configured to perform weighted processing on the to-be-transmitted data stream of the BS according to the weighted matrix, and send a data stream that has undergone the weighted processing from the BS to the MS.

The weighted matrix calculating module 31 specifically includes at least one of a first calculating module 311, a second calculating module 312, a third calculating module 313, and a fourth calculating module 314.

The first calculating module 311 is configured to, when a column vector of a channel response between each antenna of the BS and a certain antenna of the MS is $h_1$, obtain a first column vector $$w_1 = \frac{h_1^*}{\|h_1\|}$$

of the weighted matrix w, where the vector $h_1^*$ indicates a conjugate of $h_1$, and $\|h_1\|$ indicates a modulus value of the vector $h_1$;

obtain a second column vector $W_2$, which is an orthogonal vector of the first column vector $w_1$, of the weighted matrix w;

the weighted matrix $w = [w_1, w_2]$.

For example, when the BS has 4 transmit antennas, the MS has 2 receive antennas, and the column vector of the corresponding channel response between each antenna of the BS and the certain antenna of the MS is $$h_1 = \begin{bmatrix} h_{11} \\ h_{12} \\ h_{13} \\ h_{14} \end{bmatrix},$$

the first column vector of the weighted matrix w is $$w_1 = \frac{h_1^*}{\|h_1\|},$$

where $h_1^*$ indicates the conjugate of the vector $h_1$, and $\|h_1\|$ indicates the modulus value of the vector $h_1$.

The second column vector $w_2$ of the weighted matrix w is an orthogonal vector of the first column vector $$w_1 = \begin{bmatrix} w_{11} \\ w_{21} \\ w_{31} \\ w_{41} \end{bmatrix}, w_2 = \begin{bmatrix} w_{12} \\ w_{22} \\ w_{32} \\ w_{42} \end{bmatrix},$$

and the weighted matrix $w=[w_1, w_2]$.

This method may also be applicable to a case where the BS has 2N (N is an integer, and N is greater than 2) transmit antennas.

The second calculating module 312 is configured to, when the BS has 4 transmit antennas, obtain a channel response $h_{11}$ between a first antenna of the BS and a first antenna of the MS, a channel response $h_{12}$ between a second antenna of the BS and the first antenna of the MS, a channel response $h_{13}$ between a third antenna of the BS and the first antenna of the MS, a channel response $h_{14}$ between a fourth antenna of the BS and the first antenna of the MS, where the first antenna and the third antenna of the BS are a first group, the second antenna and the fourth antenna of the BS are a second group, polarization directions of two antennas in each group are the same, and the polarization directions of the antennas between the first group and the second group are orthogonal to each other;

$$r = \sum_{k=1}^{N} (h_{11}(k) \cdot h_{13}^*(k) + h_{12}(k) \cdot h_{14}^*(k)),$$

where k is an index of the channel responses, N is a statistic sum of the channel responses, $h_{13}^*$ indicates a conjugate of $h_{13}$, and $h_{14}^*$ indicates a conjugate of $h_{14}$, the weighted matrix $$w = \begin{bmatrix} \frac{r^*}{|r|} & 0 \\ 0 & \frac{r^*}{|r|} \\ 1 & 0 \\ 0 & 1 \end{bmatrix}$$

where r* indicates a conjugate of r;

or;

$$r_1 = \sum_{k=1}^{N} (h_{11}(k) \cdot h_{13}^*(k))$$

$$r_2 = \sum_{k=1}^{N} (h_{12}(k) \cdot h_{14}^*(k))$$

where k is an index of the channel responses, N is a statistic sum of the channel responses, $h_{13}^*$ indicates a conjugate of $h_{13}$, and $h_{14}^*$ indicates a conjugate of $h_{14}$, the weighted matrix $$w = \begin{bmatrix} \frac{r_1^*}{|r_1|} & 0 \\ 0 & \frac{r_2^*}{|r_2|} \\ 1 & 0 \\ 0 & 1 \end{bmatrix}$$

where $r_1^*$ indicates a conjugate of $r_1$, and $r_2^*$ indicates a conjugate of $r_2$.

The third calculating module 313 is configured to, when a channel response matrix between each antenna of the BS and each antenna of the MS is h(k), obtain the weighted matrix w(k)=h*(k), where h*(k) indicates a conjugate of h(k);

or, perform singular value decomposition on h(k) to obtain a first and a second singular vectors of the matrix h(k), and use conjugates of the two singular vectors as two column vectors of the weighted matrix w(k);

or, calculate a channel covariance matrix $$R = \sum_{k=1}^{N} (h(k) \cdot h^H(k)),$$

where k is an index of the channel responses, N is a statistic sum of the channel responses, and $h^H(k)$ indicates a conjugate transpose of h(k), perform eigenvalue decomposition on R to obtain two character vectors corresponding to a greatest eigenvalue and a second greatest eigenvalue of R, and use conjugates of the two character vectors as two column vectors of the weighted matrix w.

The fourth calculating module 314 is configured to, when the BS has 4 transmit antennas, and the MS has 2 receive antennas, obtain a channel response $h_{11}$ between a first antenna of the BS and a first antenna of the MS a channel response $h_{12}$ between a second antenna of the BS and the first antenna of the MS, a channel response $h_{13}$ between a third antenna of the BS and the first antenna of the MS, a channel response $h_{14}$ between a fourth antenna of the BS and the first antenna of the MS, where the first antenna and the third antenna of the BS are a first group, the second antenna and the fourth antenna of the BS are a second group, polarization directions of two antennas in each group are the same, and the polarization directions of the antennas between the first group and the second group are orthogonal to each other;

a channel response between the first antenna of the BS and a second antenna of the MS is $h_{21}$, a channel response between the second antenna of the BS and the second antenna of the MS is $h_{22}$, a channel response between the third antenna of the BS and the second antenna of the MS is $h_{23}$, and a channel response between the fourth antenna of the BS and the second antenna of the MS is $h_{24}$;

$$r = \sum_{k=1}^{N} (h_{11}(k) \cdot h_{13}^*(k) + h_{12}(k) \cdot h_{14}^*(k) + h_{21}(k) \cdot h_{23}^*(k) + h_{22}(k) \cdot h_{24}^*(k)),$$

where k is an index of the channel responses, N is a statistic sum of the channel responses, $h_{13}^*$ indicates a conjugate of $h_{13}$, $h_{14}^*$ indicates a conjugate of $h_{14}$, $h_{23}^*$ indicates a conjugate of $h_{23}$, and $h_{24}^*$ indicates a conjugate of $h_{24}$, the weighted matrix $$w = \begin{bmatrix} \frac{r^*}{|r|} & 0 \\ 0 & \frac{r^*}{|r|} \\ 1 & 0 \\ 0 & 1 \end{bmatrix}$$

where r* indicates a conjugate of r; or, $$r_1 = \sum_{k=1}^{N} (h_{11}(k) \cdot h_{13}^*(k) + h_{21}(k) \cdot h_{23}^*(k))$$

$$r_2 = \sum_{k=1}^{N} (h_{12}(k) \cdot h_{14}^*(k) + h_{22}(k) \cdot h_{24}^*(k))$$

where k is an index of the channel responses, N is a statistic sum of the channel responses, $h_{13}^*$ indicates a conjugate of $h_{13}$, $h_{14}^*$ indicates a conjugate of $h_{14}$, $h_{23}^*$ indicates a conjugate of $h_{23}$, and $h_{24}^*$ indicates a conjugate of $h_{24}$, the weighted matrix $$w = \begin{bmatrix} \frac{r_1^*}{|r_1|} & 0 \\ 0 & \frac{r_2^*}{|r_2|} \\ 1 & 0 \\ 0 & 1 \end{bmatrix}$$

where $r_1^*$ indicates a conjugate of $r_1$, and $r_2^*$ indicates a conjugate of $r_2$.

The weighted sending processing module 32 includes:

a weighted processing module 321, configured to perform multi input multi output MIMO encoding on to-be-transmitted data of a BS to obtain a data stream $$s = \begin{bmatrix} s_1 \\ s_2 \end{bmatrix},$$

where $S_1$ and $S_2$ are two data streams; and perform weighted processing on the data stream s according to the weighted matrix w to obtain a data stream w·s that has undergone the weighted processing; and a sending processing module 322, configured to transmit the data stream w·s that has undergone the weighted processing to the MS through each antenna of the BS corresponding to the MS.

The foregoing apparatus may specifically be the base station BS, or a specific module integrated in the BS.

To sum up, embodiments of the present disclosure may enhance the demodulation performance of MIMO demodulation because a cross polarization antenna array is adopted at a BS and certain irrelevancy exists between cross antennas, which is beneficial to the MIMO demodulation. In addition, an array gain of BF may be enhanced because the cross polarization antenna array has a co-polarization antenna group and certain relevancy exists between co-polarization antennas, which is also beneficial to the BF. Therefore, the embodiments of the present disclosure, by combining the cross polarization antenna array and an MIMO+BF technology, decrease the number of conditions of an MIMO equivalent channel in the MIMO+BF technology, and significantly enhance the overall performance of a communications system adopting the MIMO+BF technology.

The embodiments of the present disclosure calculate a weighted matrix according to the channel information between the BS and an MS. A method for calculating the weighted matrix is flexible, capable of performing adaptive adjustment to adapt to a channel change.

In the embodiments of the present disclosure, beam forming may be performed in a case of multiple antennas to make signals implement in-phase superposition, and also make relevancy of the antennas decrease to be beneficial to the MIMO demodulation. In the embodiments of the present disclosure, after a cross polarization antenna is adopted, energy of each character vector is approximately the same, which is beneficial to dual stream transmission.

Through description of the foregoing embodiments, a person skilled in the art may clearly understand that the present disclosure may be implemented by hardware, and may also be implemented by software plus a necessary hardware platform. For example, the various "modules" described herein may be implemented in one or more processors (e.g., each module may implemented in a separate processor or multiple modules may be implemented in a single processor) resident in computer equipment (e.g., a personal computer, a server, a network device, and so on). Based on such an understanding, a technical solution of the present disclosure may be implemented in a form of a software product. The software product may be stored on a non-transitory computer readable storage medium (e.g., a CD-ROM, a USB drive, a mobile hard disk, and so on), and includes several instructions to make a computer equipment (e.g., a personal computer, a server, or a network device, and so on) to execute the method described in each embodiment of the present disclosure.

The foregoing descriptions are merely exemplary specific embodiments of the present disclosure, but are not intended to limit the protection scope of the present disclosure.

Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, wherein multiple antennas of a base station (BS) form a cross polarization antenna array, the method comprising:

calculating a weighted matrix of a to-be-transmitted data stream of the BS according to channel information between the BS and a mobile station (MS); and performing weighted processing on the to-be-transmitted data stream of the BS according to the weighted matrix, and sending a data stream that has undergone the weighted processing from the BS to the MS, wherein the calculating a weighted matrix of a to-be-transmitted data stream of the BS according to channel information between the BS and the MS comprises:

obtaining a column vector $h_1$ of a channel response between each antenna of the BS and a certain antenna of the MS, and then a first column vector $$w_1 = \frac{h_1^*}{\|h_1\|}$$

of the weighted matrix w, wherein the vector $h_1^*$ indicates a conjugate of $h_1$, and $\|h_1\|$ indicates a modulus value of the vector $h_1$; and obtaining a second column vector $w_2$, which is an orthogonal vector of the first column vector $w_1$, of the weighted matrix w; wherein the weighted matrix $w=[w_1, w_2]$.

2. The data transmission method according to claim 1, further including forming the cross polarization antenna array by dividing the multiple antennas of the BS into two groups according to a polarization direction, wherein polarization directions of the antennas in each group are the same, and polarization directions of the antennas between the two groups are orthogonal to each other.

3. The data transmission method according to claim 1, wherein the performing weighted processing on the to-be-transmitted data stream of the BS according to the weighted matrix, and sending a data stream that has undergone the weighted processing from the BS to the MS comprises:

performing multi input multi output MEMO encoding on the to-be-transmitted data stream of the BS to obtain a data stream $$s = \begin{bmatrix} s_1 \\ s_2 \end{bmatrix},$$

wherein $s_1$ and $s_2$ are two data streams;

performing the weighted processing on the data stream s according to the weighted matrix w to obtain a data stream w·s that has undergone the weighted processing; and transmitting the data stream w·s that has undergone the weighted processing to the MS through each antenna of the BS corresponding to the MS.

4. A data transmission method wherein multiple antennas of a base station (BS) form a cross polarization antenna array, the method comprising:

calculating a weighted matrix of a to-be-transmitted data stream of the BS according to channel information between the BS and a mobile station (MS); and performing weighted processing on the to-be-transmitted data stream of the BS according to the weighted matrix, and sending a data stream that has undergone the weighted processing from the BS to the MS wherein the calculating a weighted matrix of a to-be-transmitted data stream of the BS according to channel information between the BS and the MS comprises:

when the BS has 4 transmit antennas, obtaining a channel response $h_{11}$ between a first antenna of the BS and a first antenna of the MS, a channel response $h_{12}$ between a second antenna of the BS and the first antenna of the MS, a channel response $h_{13}$ between a third antenna of the BS and the first antenna of the MS, a channel response $h_{14}$ between a fourth antenna of the BS and the first antenna of the MS, wherein the first antenna and the third antenna are a first group, the second antenna and the fourth antenna are a second group, wherein polarization directions of two antennas in each group are the same, and wherein polarization directions of the antennas between the first group and the second group are orthogonal to each other; wherein $$r = \sum_{k=1}^{N} (h_{11}(k) \cdot h_{13}^*(k) + h_{12}(k) \cdot h_{14}^*(k)),$$

wherein k is an index of the channel responses, wherein r is an intermediate value used in the calculation of the weighted matrix w, N is a statistic sum of the channel responses, $h_{13}^*$ indicates a conjugate of $h_{13}$, and $h_{14}^*$ indicates a conjugate of $h_{14}$;

the weighted matrix $$w = \begin{bmatrix} \frac{r^*}{|r|} & 0 \\ 0 & \frac{r^*}{|r|} \\ 1 & 0 \\ 0 & 1 \end{bmatrix};$$

wherein $r^*$ indicates a conjugate of r; or;

$$r_1 = \sum_{k=1}^{N} (h_{11}(k) \cdot h_{13}^*(k))$$

$$r_2 = \sum_{k=1}^{N} (h_{12}(k) \cdot h_{14}^*(k))$$

wherein k is an index of the channel responses, N is a statistic sum of the channel responses, $h_{13}^*$ indicates a conjugate of $h_{13}$, and $h_{14}^*$ indicates a conjugate of $h_{14}$;

the weighted matrix $$w = \begin{bmatrix} \frac{r_1^*}{|r_1|} & 0 \\ 0 & \frac{r_2^*}{|r_2|} \\ 1 & 0 \\ 0 & 1 \end{bmatrix};$$

and wherein $r_1^*$ indicates a conjugate of $r_1$, and $r_2^*$ indicates a conjugate of $r_2$.

5. A data transmission method wherein multiple antennas of a base station (BS) form a cross polarization antenna array, the method comprising:
   calculating a weighted matrix of a to-be-transmitted data stream of the BS according to channel information between the BS and a mobile station (MS); and
   performing weighted processing on the to-be-transmitted data stream of the BS according to the weighted matrix, and
   sending a data stream that has undergone the weighted processing from the BS to the MS wherein
   the calculating a weighted matrix of a to-be-transmitted data stream of the BS according to channel information between the BS and the MS comprises:
   when a channel response matrix between each antenna of the BS and each antenna of the MS is h(k),
   obtaining the weighted matrix w(k)=h*(k), wherein h*(k) indicates a conjugate of h(k);
   or, performing singular value decomposition on h(k) to obtain a first singular vector and a second singular vector of the matrix h(k), and using conjugates of the first and second singular vectors as two column vectors of the weighted matrix w(k);
   or, calculating a channel covariance matrix $$R = \sum_{k=1}^{N} (h(k) \cdot h^H(k)),$$

wherein k is an index of channel responses, N is a statistic sum of the channel responses, and $h^H(k)$ indicates a conjugate transpose of h(k),
   performing eigenvalue decomposition on R to obtain two character vectors corresponding to a greatest eigenvalue and a second greatest eigenvalue of R, and
   using conjugates of the two character vectors as two column vectors of the weighted matrix w.

6. A data transmission method, wherein multiple antennas of a base station (BS) form a cross polarization antenna array, the method comprising:
   calculating a weighted matrix of a to-be-transmitted data stream of the BS according to channel information between the BS and a mobile station (MS); and
   performing weighted processing on the to-be-transmitted data stream of the BS according to the weighted matrix, and
   sending a data stream that has undergone the weighted processing from the BS to the MS, wherein the calculating a weighted matrix of a to-be-transmitted data stream of the BS according to channel information between the BS and the MS comprises:
   when the BS has 4 transmit antennas, and the MS has 2 receive antennas, obtaining a channel response $h_{11}$ between a first antenna of the BS and a first antenna of the MS, a channel response $h_{12}$ between a second antenna of the BS and the first antenna of the MS, a channel response $h_{13}$ between a third antenna of the BS and the first antenna of the MS, a channel response $h_{14}$ between a fourth antenna of the BS and the first antenna of the MS, wherein the first antenna and the third antenna of the BS are a first group, the second antenna and the fourth antenna of the BS are a second group, wherein polarization directions of two antennas in each group are the same, and wherein polarization directions of the antennas between the first group and the second group are orthogonal to each other;
   obtaining a channel response $h_{21}$ between the first antenna of the BS and a second antenna of the MS, a channel response $h_{22}$ between the second antenna of the BS and the second antenna of the MS, a channel response $h_{23}$ between the third antenna of the BS and the second antenna of the MS, and the channel response $h_{24}$ between the fourth antenna of the BS and the second antenna of the MS; wherein $$r = \sum_{k=1}^{N} (h_{11}(k) \cdot h_{13}^*(k) + h_{12}(k) \cdot h_{14}^*(k) + h_{21}(k) \cdot h_{23}^*(k) + h_{22}(k) \cdot h_{24}^*(k)),$$

wherein k is an index of the channel responses, wherein r is an intermediate value used in the calculation of the weighted matrix w, N is a statistic sum of the channel responses, $h_{13}^*$ indicates a conjugate of $h_{13}$, $h_{14}^*$ indicates a conjugate of $h_{14}$, $h_{23}^*$ indicates a conjugate of $h_{23}$, and $h_{24}^*$ indicates a conjugate of $h_{24}$;
   the weighted matrix $$w = \begin{bmatrix} \frac{r^*}{|r|} & 0 \\ 0 & \frac{r^*}{|r|} \\ 1 & 0 \\ 0 & 1 \end{bmatrix}$$

wherein r* indicates a conjugate of r; or, $$r_1 = \sum_{k=1}^{N} (h_{11}(k) \cdot h_{13}^*(k) + h_{21}(k) \cdot h_{23}^*(k))$$

$$r_2 = \sum_{k=1}^{N} (h_{12}(k) \cdot h_{14}^*(k) + h_{22}(k) \cdot h_{24}^*(k))$$

wherein k is an index of the channel responses, N is a statistic sum of the channel responses, $h_{13}^*$ indicates a conjugate of $h_{13}$, $h_{14}^*$ indicates a conjugate of $h_{14}$, $h_{23}^*$ indicates a conjugate of $h_{23}$, and $h_{24}^*$ indicates a conjugate of $h_{24}$;
   the weighted matrix $$w = \begin{bmatrix} \frac{r_1^*}{|r_1|} & 0 \\ 0 & \frac{r_2^*}{|r_2|} \\ 1 & 0 \\ 0 & 1 \end{bmatrix}$$

and wherein $r_1^*$ indicates a conjugate of $r_1$, and $r_2^*$ indicates a conjugate of $r_2$.

7. A data transmission apparatus, comprising:
   a weighted matrix calculating processor, configured to calculates a weighted matrix of a to-be-transmitted data stream of a base station (BS) according to channel information between the BS and a mobile station (MS), wherein multiple antennas of the BS form a cross polarization antenna array; and a weighted sending processor, configured to perform weighted processing on the to-be-transmitted data stream of the BS according to the weighted matrix, and sends a data stream that has undergone the weighted processing from the BS to the MS, wherein the weighted matrix calculating processor comprises at least one of a first calculating processor, a second calculating processor, a third calculating processor, and a fourth calculating processor;

wherein the first calculating processor is configured to, when a column vector of a channel response between each antenna of the BS and a certain antenna of the MS is $h_1$, obtain a first column vector $$w_1 = \frac{h_1^*}{\|h_1\|}$$

of the weighted matrix w, wherein the vector $h_1^*$ indicates a conjugate of $h_1$ and the $\|h_1\|$ indicates a modulus value of the vector $h_1$;

obtain a second column vector $w_2$, which is an orthogonal vector of the first column vector $w_1$, of the weighted matrix w;

the weighted matrix $w=[w_1, w_2]$;

wherein the second calculating processor is configured to, when the BS has 4 transmit antennas, obtain a channel response $h_{11}$ between a first antenna of the BS and a first antenna of the MS, a channel response $h_{12}$ between a second antenna of the BS and the first antenna of the MS, a channel response $h_{13}$ between a third antenna of the BS and the first antenna of the MS, a channel response $h_{14}$ between a fourth antenna of the BS and the first antenna of the MS wherein the first antenna and the third antenna of the BS are a first group the second antenna and the fourth antenna of the BS are a second group wherein polarization directions of two antennas in each group are the same and wherein polarization directions of the antennas between the first group and the second group are orthogonal to each other; wherein $$r = \sum_{k=1}^{N} (h_{11}(k) \cdot h_{13}^*(k) + h_{12}(k) \cdot h_{14}^*(k)),$$

wherein k is an index of the channel responses, wherein r is an intermediate value used in the calculation of the weighted matrix w, N is a statistic sum of the channel responses, $h_{13}^*$ indicates a conjugate of $h_{13}$, and $h_{14}^*$ indicates a conjugate of $h_{14}$;

the weighted matrix $$w = \begin{bmatrix} \frac{r^*}{|r|} & 0 \\ 0 & \frac{r^*}{|r|} \\ 1 & 0 \\ 0 & 1 \end{bmatrix}$$

wherein r* indicates a conjugate of r; or;

$$r_1 = \sum_{k=1}^{N} (h_{11}(k) \cdot h_{13}^*(k))$$

$$r_2 = \sum_{k=1}^{N} (h_{12}(k) \cdot h_{14}^*(k))$$

wherein k is an index of the channel responses, N is a statistic sum of the channel responses, $h_{13}^*$ indicates a conjugate of $h_{13}$, and $h_{14}^*$ indicates a conjugate of $h_{14}$;
the weighted matrix $$w = \begin{bmatrix} \frac{r_1^*}{|r_1|} & 0 \\ 0 & \frac{r_2^*}{|r_2|} \\ 1 & 0 \\ 0 & 1 \end{bmatrix}$$

wherein $r_1^*$ indicates a conjugate of $r_1$, and $r_2^*$ indicates a conjugate of $r_2$;

wherein the third calculating processor is configured to, when a channel response matrix between each antenna of the BS and each antenna of the MS is h(k), obtain the weighted matrix w(k)=h*(k), wherein the h*(k) indicates a conjugate of h(k);

or, perform singular value decomposition on h(k) to obtain a first singular vector and a second singular vector of the matrix h(k), and use conjugates of the first and second singular vectors as two column vectors of the weighted matrix w(k);

or calculate a channel covariance matrix $$R = \sum_{k=1}^{N} (h(k) \cdot h^H(k)),$$

wherein k is an index of the channel responses, N is a statistic sum of the channel responses, and $h^H(k)$ indicates a conjugate transpose of h(k), perform eigenvalue decomposition on R to obtain two character vectors corresponding to a greatest eigenvalue and a second greatest eigenvalue of R, and use conjugates of the two character vectors as two column vectors of the weighted matrix w;

wherein the fourth calculating processor is configured to, when the BS has 4 transmit antennas, and the MS has 2 receive antennas, obtain a channel response $h_{11}$ between a first antenna of the BS and a first antenna of the MS a channel response $h_{12}$ between a second antenna of the BS and the first antenna of the MS, a channel response $h_{13}$ between a third antenna of the BS and the first antenna of the MS, a channel response $h_{14}$ between a fourth antenna of the BS and the first antenna of the MS, wherein the first antenna and the third antenna of the BS are a first group, the second antenna and the fourth antenna of the BS are a second group, wherein polarization directions of two antennas in each group are the same, and wherein polarization directions of the antennas between the first group and the second group are orthogonal to each other;

wherein a channel response between the first antenna of the BS and a second antenna of the MS is $h_{21}$, a channel response between the second antenna of the BS and the second antenna of the MS is $h_{22}$, a channel response between the third antenna of the BS and the second antenna of the MS is $h_{23}$, and a channel response between the fourth antenna of the BS and the second antenna of the MS is $h_{24}$;

$$r = \sum_{k=1}^{N} (h_{11}(k) \cdot h_{13}^*(k) + h_{12}(k) \cdot h_{14}^*(k) + h_{21}(k) \cdot h_{23}^*(k) + h_{22}(k) \cdot h_{24}^*(k)),$$

wherein k is an index of the channel responses N is a statistic sum of the channel responses, $h_3^*$ indicates a conjugate of $h_{13}$, $h_{14}^*$ indicates a conjugate of $h_{14}$, $h_{23}^*$ indicates a conjugate of $h_{23}$, and $h_{24}^*$ indicates a conjugate of $h_{23}$, the weighted matrix $$w = \begin{bmatrix} \frac{r^*}{|r|} & 0 \\ 0 & \frac{r^*}{|r|} \\ 1 & 0 \\ 0 & 1 \end{bmatrix}$$

wherein r* indicates a conjugate of r; or, $$r_1 = \sum_{k=1}^{N} (h_{11}(k) \cdot h_{13}^*(k) + h_{21}(k) \cdot h_{23}^*(k))$$

$$r_2 = \sum_{k=1}^{N} (h_{12}(k) \cdot h_{14}^*(k) + h_{22}(k) \cdot h_{24}^*(k))$$

wherein k is an index of the channel responses, N is a statistic sum of the channel responses, $h_{13}^*$ indicates a conjugate of $h_{13}$, $h_{14}^*$ indicates a conjugate of $h_{14}$, $h_{23}^*$ indicates a conjugate of $h_{23}$, and $h_{24}^*$ indicates a conjugate of $h_{24}$;

the weighted matrix $$w = \begin{bmatrix} \frac{r_1^*}{|r_1|} & 0 \\ 0 & \frac{r_2^*}{|r_2|} \\ 1 & 0 \\ 0 & 1 \end{bmatrix}$$

and wherein $r_1^*$ indicates a conjugate of $r_1$, and $r_2^*$ indicates a conjugate of $r_2$.

8. The data transmission apparatus according to claim 7, wherein the weighted sending processor comprises:

a weighted processor, configured to perform multi input multi output MEMO encoding on to-be-transmitted data of the BS to obtain a data stream $$s = \begin{bmatrix} s_1 \\ s_2 \end{bmatrix},$$

wherein $s_1$ and $s_2$ are two data streams; and perform the weighted processing on the data stream s according to the weighted matrix w to obtain a data stream w·s that has undergone the weighted processing; and a sender, configured to transmit the data stream w·s that has undergone the weighted processing to the MS through each antenna of the BS corresponding to the MS.

\* \* \* \* \*

UNITED STATES PATENT AND TRADEMARK OFFICE
CERTIFICATE OF CORRECTION

| | | |
|---|---|---|
| PATENT NO. | : 9,094,070 B2 | Page 1 of 1 |
| APPLICATION NO. | : 14/053238 | |
| DATED | : July 28, 2015 | |
| INVENTOR(S) | : Fang et al. | |

It is certified that error appears in the above-identified patent and that said Letters Patent is hereby corrected as shown below:

In the claims,

Column 13, line 41, "MEMO" should read -- MIMO --.

Column 20, line 23, "MEMO" should read -- MIMO --.

Signed and Sealed this
Twelfth Day of January, 2016

Michelle K. Lee
*Director of the United States Patent and Trademark Office*